Patented June 2, 1953

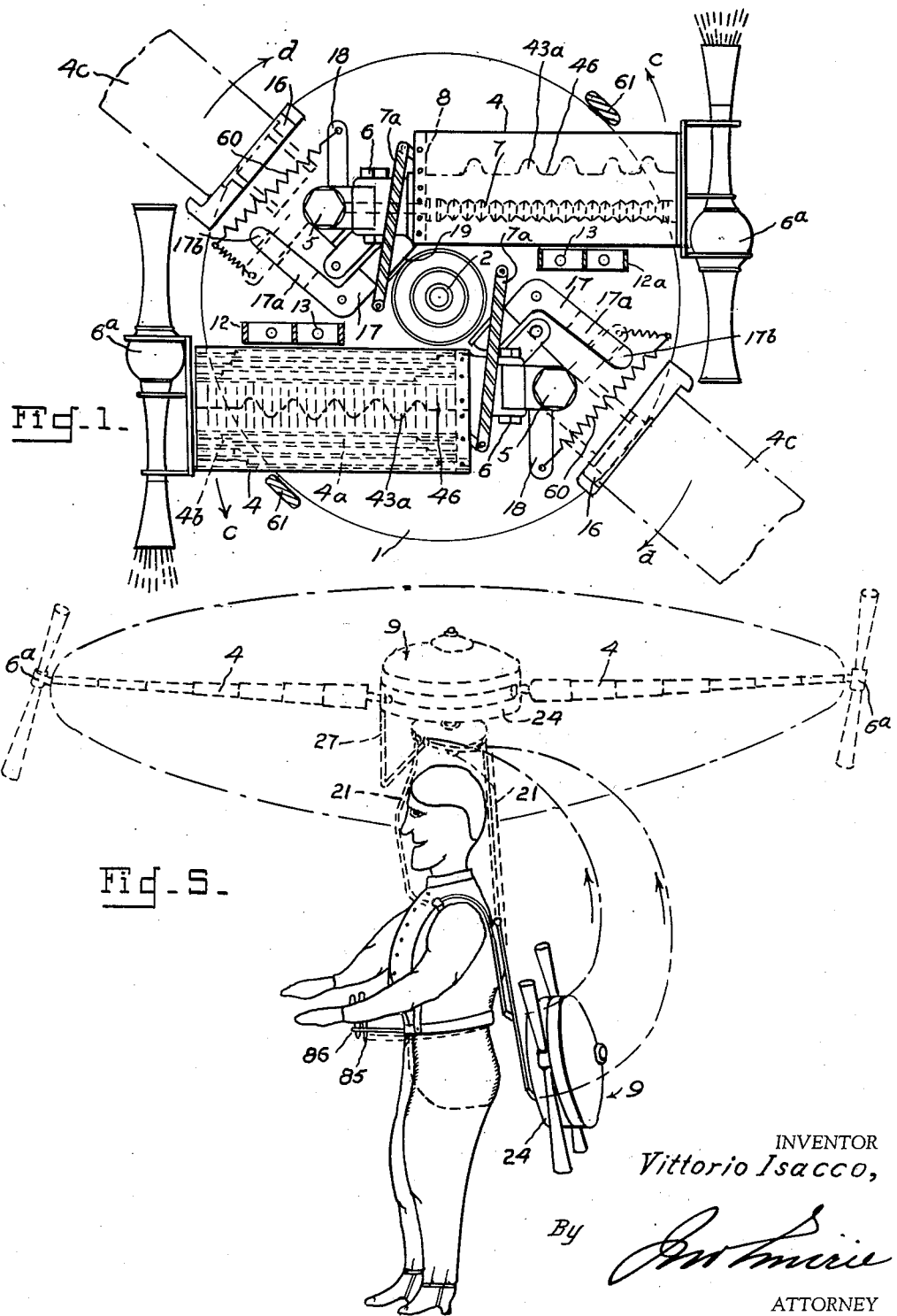

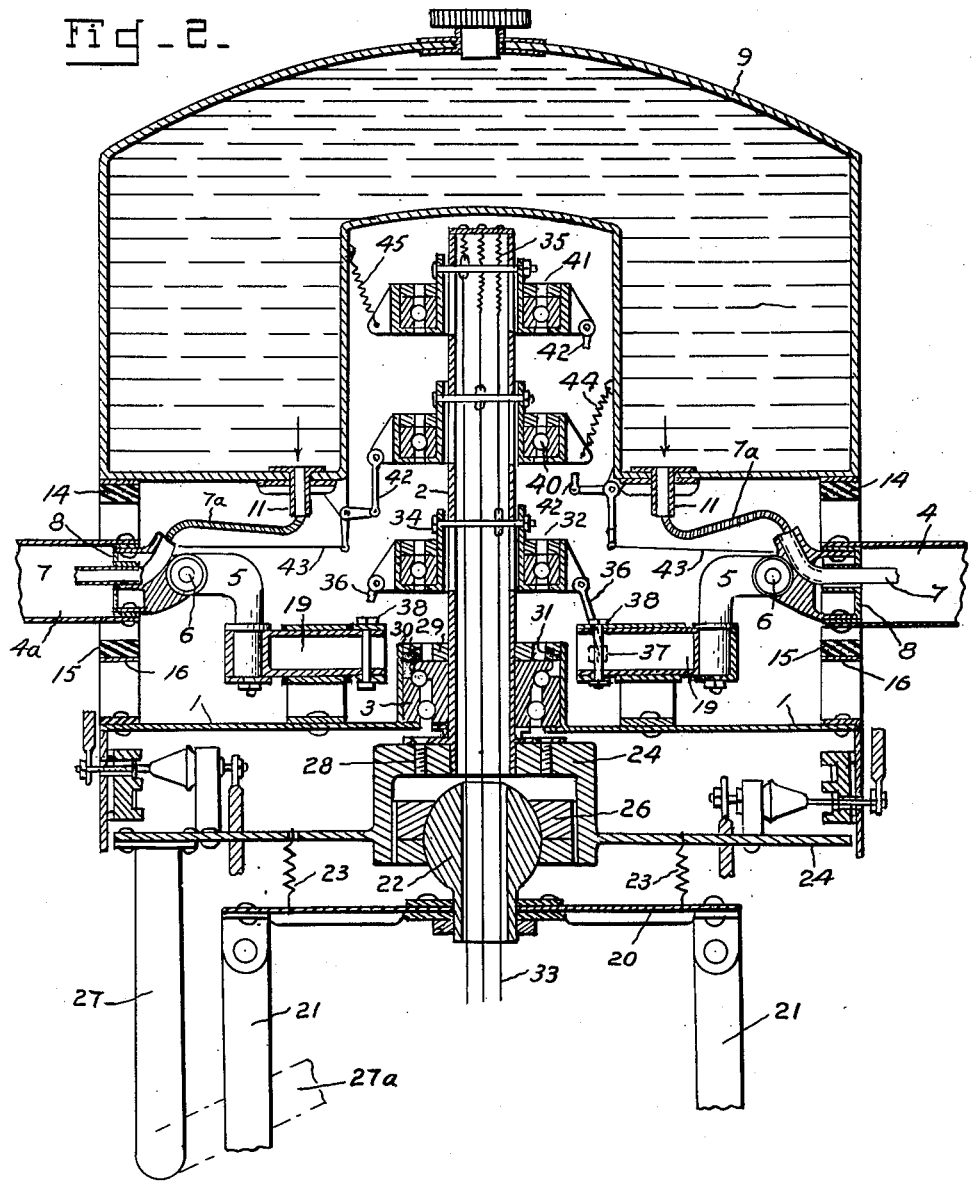

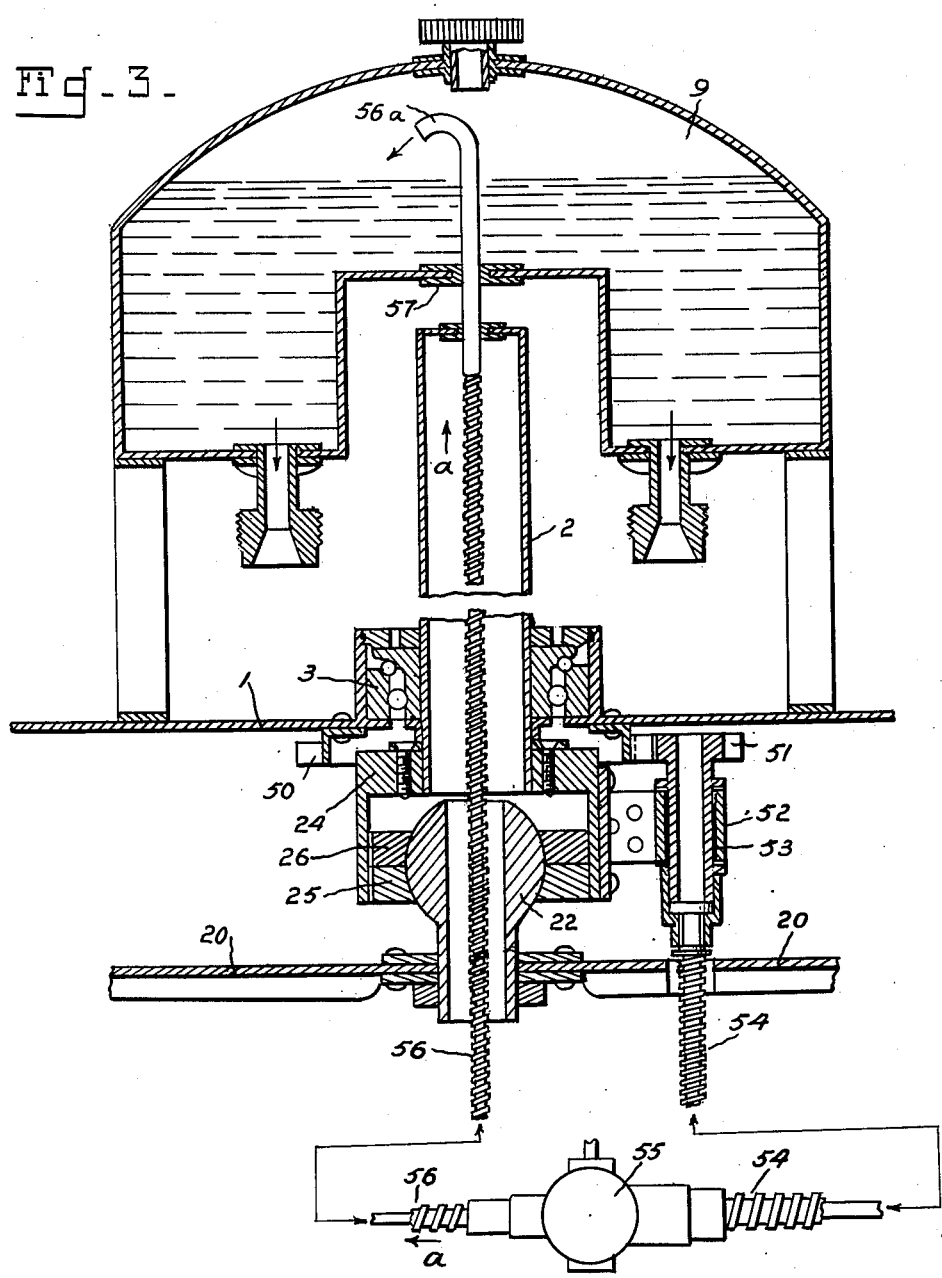

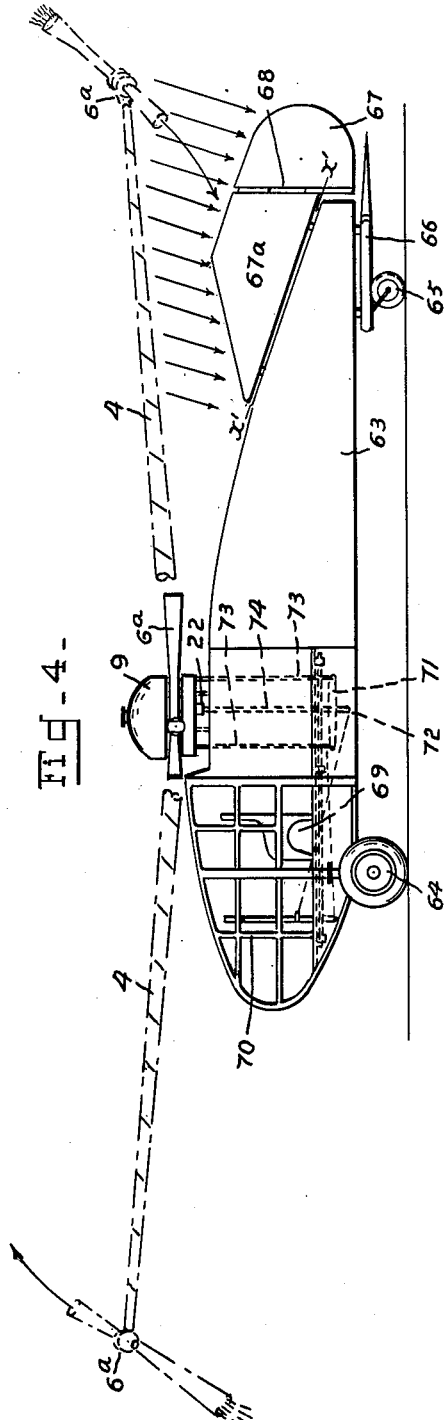

2,640,549

UNITED STATES PATENT OFFICE 2,640,549

JET-DRIVEN SUSTAINING PROPELLER FOR AIRCRAFT

Vittorio Isacco, London, England

Application August 3, 1946, Serial No. 688,270
In Great Britain August 3, 1945

4 Claims. (Cl. 170—135.4)

This invention has reference to improvements in and relating to sustaining propeller for flying machines and to such machines comprising a sustaining propeller according to the invention or two or more of the sustaining propellers according to the invention.

A sustaining propeller according to the invention comprises blades of telescopic form, said blades either being wholly of telescopic form or being telescopic in part. The blades are of aerofoil section.

A flying machine according to the invention comprises one or more of the above propellers and one or more engines fitted either on the blades or on the fuselage for driving same. The engines are preferably of jet type mounted at or near the tips of the propeller blades or some of them.

The said sustaining propeller or propellers may take no part in the translational flight of the machine to which they are applied or they may be arranged to assist such flight or, if desired, to produce it. In the latter case the sustaining propeller will be the sole means producing translational flight; in other cases other means such as a forward air screw is provided to produce or to assist in producing translational flight. In all cases the or each sustaining propeller is engine-driven as above stated. Flying machines according to the present invention essentially differ, therefore, from parachutes and plane cabin parachutes according to the invention set forth in my Patents Nos. 2,457,376 and 2,458,855 in that the propellers of the said parachutes and plane cabin parachutes have for their function simply to limit the rate of descent of a load.

The present invention may be applied to flying machines of any suitable form. Such applications comprise the combination of telescopically bladed propellers with (a) aeroplanes, (b) a plane cabin provided with an engine in it or with engines on the propeller blades for driving the propeller, (c) a motor car body and (d) a cycle. The invention may also be applied to harness for attachment to the human body whereby the wearer is able to "fly" at will, suitable harness being described in my Patent No. 2,506,873.

The axis on which the blades flap may be arranged to cut the axis of rotation of the propeller.

The propellers may comprise two or more telescopic or part telescopic blades and are preferably driven by jet propulsion engines preferably mounted on the blades, for example at or near the tips thereof.

The telescopic elements necessarily have a play although small around their longitudinal axis as also on the direction of lift and drag.

In translation, where the blades are continuously subject to variable pressures, such a play would give way to an excessive wear of the surfaces of the shoulders which bear one against the other.

In order to avoid the practical inconvenience of this play, several devices can be incorporated in the propeller blades to overcome or minimise the play.

One simple method consists in making the surfaces which bear one against the other slightly "rough." On account of the strong pressure which exists, pressure due to the centrifugal force, the rotation of the surfaces one in relation to the other would become difficult.

Another solution giving a more efficient locking of one element with respect to the other, is to provide one of them with small pins which enter in opposite and conveniently shaped holes in the shoulder of the other element. The centrifugal force generated during rotation keeps them very tightly together, and the above mentioned play would no longer take place.

The blades folded or collapsed and at rest, as described in my aforementioned Patents Nos. 2,457,376 and 2,458,855 will occupy before use a very small space and when mounted on a small and light frame or body the whole machine no longer requires special sheds, and in some cases can be located in a private house or garage.

In such cases in which the propeller is driven by engines mounted on the blades, the fuel feed to these engines is preferably as described in my Patent No. 2,585,468 but the method and means for controlling the lateral and longitudinal stability and also to incline the axis of the propeller in the direction of flight is simplified and different, the relative low weight of the rotor allowing for the utilisation of this method as will be described herein.

In order to achieve a vertical flying machine of any kind the following requirements have in the first place to be fulfilled. Hereafter I summarise them and set forth the solutions adopted in the present invention.

(1) A certain amount of proper or inherent stability of the machine. This is resolved by the adoption of a single sustaining propeller preferably driven by engines mounted at the tips of the blades, these blades being articulated at their attachment at the root.

(2) A control of the pitch angle of the blades for the various conditions of flight.

This is preferably realised by the means described in the aforementioned Patent No. 2,585,468 by direct action on the tubes ending the blades after their fitting inside the hub of the propeller.

(3) A lateral and longitudinal control for the stability of the machine, or for inclining the machine in the direction required for translation.

This is realised in the present invention by the direct action on the axis of the propeller, which is inclined in the required direction of flight.

It is, therefore, the same method as applied for the stability and the control in descent of the rotating wing parachute, as described in the aforementioned Patents Nos. 2,457,376 and 2,458,855.

(4) A control around a vertical azimuth of the machine (control of the direction of flight of the machine).

This is realised as described, for example, in my aforementioned Patent No. 2,585,468, in such cases in which the propeller is driven by engines mounted on the blades.

A vertical rudder is fitted, generally on the back of the machine, and has its angle around an horizontal or approximately horizontal axis under the control of the pilot, thus allowing him to utilise the flow of air from the rotating propeller in order to obtain the couple which will rotate the body of the machine in the required direction.

(5) A feed for the jet engines mounted on the tips of the blades, the control of the admission of the fuel to the engines, and the switching off and on of the ignition system.

This is preferably achieved as described in the aforementioned Patent No. 2,585,468 but with the following differences.

(a) The fuel is located inside the inner or exterior elements of the telescopic blades when the engines are required to work for only very short periods; or (b) The fuel is located only in the rotating reservoir, rotating with the blades and mounted on the top of the central shaft of the propeller around which it rotates. This will give a longer period of operation for the engines; or (c) The fuel is contained also in a main tank, located near or inside the body of the machine, a fuel pump operated by the hub of the propeller during rotation being adapted to raise the fuel from the main tank to the rotating reservoir, and from there by virtue of gravity and of centrifugal force, to the engines after crossing inside the blades.

(d) It is evident that on account of the collapsing of the blades at rest, the fuel feeding tubes which cross the blades must extend to a length corresponding to the full development of the blades. They are, therefore in most cases, constituted by an elastic material, or by elements constructed "accordion" fashion or as a combination of the two constructions.

(e) The retractive device, as described in the specification of my Patent No. 2,458,855 for the parachute, is here replaced, by the said feeding tube so that the extent of the development of the blades will depend on the speed of rotation of the blades, and after landing they will be automatically collapsed since the speed of rotation will progressively decrease.

A sustaining and propulsive propeller as described above, which fulfills all the requirements when applied to small helicopter machines and whose blades can be collapsed and which may also be hinged at rest so as to occupy a very reduced volume, has special and important applications in practice which cannot be fulfilled with non-telescopic blades.

The most important applications which will be described are:

(1) To a small fuselage—constituting in this way a helicopter of light weight and small dimensions.

(2) To a motor-car body, preferably constructed lighter than standard motor-cars.

(3) To a motor-cycle or tricycle or bicycle.

(4) To a "flying-man." In this case the propeller with its jet-engines is preferably located at rest on the back of the pilot and is hinged over the head when flight is required. The harness for attaching the propeller to the pilot is preferably as described in the Patent No. 2,457,376 and:

(5) To a standard airplane. In this case, the propeller, provided with driving engines, is located before use inside and near the ceiling of the fuselage and preferably on the passengers' cabin.

The purpose of this last composite machine is to combine both the flying qualities of the aeroplane and the helicopter. The aeroplane has the best efficiency of any other flying machine in translation, but requires a long run over the ground and, therefore, special landing fields for the take-off and for the landing are necessary. The helicopter has a lower efficiency but requires only a short run for take-off and landing.

Therefore, by fitting in a standard aeroplane a sustaining propeller which can be concealed in horizontal flight but which can be utilised both for the take-off and for the landing periods, the qualities and especially the safety of such aeroplanes will increase and the take-off and landing will become possible in almost any ground or place.

According to the power available for driving the propeller and the diameter of this propeller, the take-off and the landing distance will be considerably reduced and will even become vertical in the limiting case.

This composite machine is a practical possibility only on account of the telescopic construction of the blades and because the blades are engine-driven.

Another result of fitting a telescopically bladed propeller to the standard aeroplane is, if the passengers' cabin or freight cabin is made detachable upwards from the fuselage, as described in a similar way for a downwards detachable parachute cabin in my Patent No. 2,458,855.

In fact it becomes possible for a standard aeroplane liner to detach a passengers' or main cabin which could be under the control of the pilot in charge of it and land over buildings or in the centre of cities, in general in places where the aeroplane could not land. It will constitute also a safety cabin in case of accident to the plane whatever might be the power of the jet-engines fitted on the blades, and even if these engines are out of operation or if no engine at all is fitted on them.

In this latter case the speed of translation of the plane will accelerate to its maximum value the speed of rotation of the blades and as a consequence the full development of the blades if the direction of flight is of a certain angle below the plane of rotation of the propeller. This is achieved either by inclining the axis of rotation of the said propeller backwards or by taking an inclined but downward translation for the plane.

The propeller may be started by direct transmission from the front engine or even by hand or by any usual means, the component of the flow of air below its plane of rotation, will accelerate it until the lift of the propeller will become sufficient to lift the cabin from the fuselage either automatically or by a release lever controlled by the pilot. For such an upward release of the cabin the sliding tubes solid with the fuselage are inclined backwards to the translation, the position of the rollers solid with the detachable cabin and the release lever and stops being similar to the detachable cabin-parachute as described in Patent No. 2,458,855.

The invention and its main practical application will now be described with reference to the accompanying drawings which are given by way of an example in each case:

Fig. 1 is a plan view of a unit comprising a telescopically bladed propeller provided with engines at the tips of the blades, the blades being collapsed and folded as shown in full line whilst the position of the blades when they are unfolded is shown in chain dotted lines;

Fig. 2 is a vertical cross section of the hub portion of the unit shown in Fig. 1 and also includes elements contiguous to the hub, the plane of section being that containing the axes of the blades when the latter are unfolded;

Fig. 3 is a vertical cross section of the hub portion of the unit shown in Fig. 1 but the plane of section is different from that of Fig. 2, Fig. 3 also showing the way in which fuel is fed to the auxiliary reservoir from the main tank (which main tank is located in the body of an aeroplane or the like);

Fig. 4 is a side view of a small helicopter fitted with the telescopically bladed propeller in the position of rest, said figure also showing, in chain dotted lines, the blades when they are fully developed or extended, and Fig. 5 is a perspective view of a flying machine according to the invention adapted to be applied to the person as shown, said machine comprising harness as set forth, for example, in my Patent No. 2,506,873 and the unit substantially as shown in Figs. 1 and 2. The said unit is shown in full line in its out of use position and in dotted line in its position of use.

The sustaining propeller as shown in Figs. 1 and 2, comprises an annular hub plate 1 which is mounted to rotate freely around the central shaft 2 by means of the double thrust ball-bearing 3. Above this plate are mounted the telescopic blades 4 consisting of telescopically nested elements 4a adapted to be collapsed within each other so that they occupy at rest, or in storage position, a length equal to or approximately equal to the length of the first or root element. The first or root element is attached to the rotatable plate 1 by means of a double joint with vertical and horizontal articulations 5 and 6. The relative sliding movement of the elements when they are telescopically extended is limited by shoulders 4b as shown in Fig. 1, as described in Patent No. 2,458,855.

In storage position, the blades are folded around their vertical joint-articulations 5 so that when only two blades constitute the propeller, they are disposed parallel to each other overlying the upper plate 1, their combined overall dimension parallel to their axes being about equal to the diameter of the said rotating plate.

On the outer ends of the tip elements of the blades, are mounted small jet-propulsion engines 6a.

Within each blade is an extensible fuel tube 7 which may be of elastic material or of accordion construction, as shown in broken line in the upper blade of Fig. 1. These tubes 7 are attached at their outer ends to the fuel distributor of the respective engines 6a and at their inner ends to the root ends 8 of the root elements 4a. Thus, the fuel tubes 7, being fixed to the tip and root elements, expand when the blades are developed or extended by centrifugal force and retract the blades when the centrifugal force diminishes. Each fuel tube 7' is in communication through the root end 8 of the respective root element with a flexible hose 7a that is connected at one end to said root end 8 and at the outer end to the fuel reservoir 9 by means of the nipple joint 11 (Fig. 2). The upper reservoir 9 is mounted on the rotatable plate 1 by means of legs 12, 12a (Fig. 1) secured by bolts 13. The position of the hoses 7a with the blades in storage position is shown in Fig. 1 while the position of said hoses when the blades are in operative position is shown in Fig. 2.

The vertical oscillations of the blades around the horizontal axes 6 are limited in this example by elastic stops 14 and 15, Fig. 2, fixed to a channel shaped part 16 which in turn is fixed at its upper part with the reservoir 9 and at its lower part with the plate 1. In this manner, the blades 4 can enter the part 16 at the end of their hinging movement and their legs 18 are locked automatically by the locking device 17, which may be of the type shown in Figure 6 of Patent No. 2,457,376, and said legs are releasably seated between the interior elastic stops 17a and 17b, as shown in broken lines in Fig. 1. In this manner the blades are elastically mounted in their plane of rotation, since they are articulated around the vertical articulation 5, but are maintained by the legs 18 which are held during flight between the said elastic stops.

The locking device 17 is, in this case, fixed with the tube 19 at the end of the blades, and not with the plate 1 as in Patent No. 2,457,376. This is because the pitch angle of the blades is, in the present embodiment, under the control of the pilot (as will be described) and as the legs 18 and the locking devices 17 are both fixed with the blades they will have the same pitch and are sure to enter one into the other and then to remain in this position whatever might be the pitch angle of the blades at rest or during flight.

The various controls and the manner of mounting the propeller over the body of the machine are shown in Fig. 2. The plate 20 is attached to the body of the machine by means of the tubes 21 or by any other means. The plate 20 and the tubes 21 form part of the upper structure of the body of the machine. On this plate 20 is fitted a spherical or universal joint 22 on which is mounted the whole propeller. The propeller may have the engines mounted on its blades or the propeller may be engine-driven in any suitable manner. The propeller is preferably hinged in all directions around this spherical joint to the body of the machine, suitable springs 23 being provided between the plate 20 and the fixed part 24 of the hub of the propeller, in order to limit and to brake any uncontrolled inclinations. Nuts 25, 26 fix the propeller over the spherical joint 22.

To the fixed part 24 of the hub is fixed a lever 27 joined to a similar one fixed in the same way at 90° by means of the tube 27a. It will be seen that by pulling or pushing this lever, the axis of the propeller will be tilted in any direction. In fact, the part 24 of the hub is fixed with the central shaft 2 of the propeller by means of the exterior ring of the screws 28. The double thrust ball-bearing 3 is fixed with the rotating plate 1 of the hub. Thus a pull or push on lever 27 will tilt the whole of the propeller and both parts of its hub 1 and 24 around the spherical joint 22. The ball-bearing 3 is maintained in position by means of nuts 29 and 30, the latter being provided with a packing ring 31 to prevent entry of dust into the ball bearing 3.

A ball-bearing system 32 is slidably mounted on the shaft 2 for the control of the general incidence of the blades. Its construction is similar to the control described in my Patent No. 2,585,468 but here the sliding movement is effected by a single wire 33 attached to the sliding pin 34, a spring 35 being provided at upper end for sliding the system 32 upwardly when the wire 33 is released. The control of this bearing system 32 can also be effected by a double set of wires displacing the pin 34 from two opposite points as described in my Patent No. 2,585,468. The same applies for the other controls.

The legs 36 of the ball-bearing system 32 are articulated at both ends, the lower end being connected to a lever 37 rigid by means of the bolt 38 or otherwise, with the tubes 19 forming the inner ends of the blade structures. The lever 37 once operated by the sliding movement of the ball-bearing system 32 will act in torsion on tubes 19 and therefore will change the pitch angle of the blades to an equal extent for all the blades.

Above the ball-bearing system 32 are fitted the two ball-bearing systems 40 and 41 which are capable of sliding along the central shaft 2 and by this movement control respectively the engine throttles by means of the rods 42 to which are connected the wires 43 which are, in turn, connected to folded or coiled wires or springs 43a located inside the outer element of the blade. Before use, wires 43a are contracted inside the elements of the blades as shown in Fig. 1. Springs 44 and 45 are fitted to the bearings 40, 41 respectively on the opposite side of the rods 42 in order to balance the tensions. The control of these bearing systems 40 and 41 is similar to that described for the system 32 and can eventually be operated by a double system of wires as described in my Patent No. 2,585,468 or even by rigid tubes entering one into another.

The ignition of the engines may be effected by means of a system which is indicated in Figure 2 and which is described in Patent No. 2,585,468. This system comprises electric supply wires 150 respectively connected to brushes 151 which are mounted on the fixed hub 24 and respectively engage one of a pair of contact rings 152 that are carried by the rotatable plate 1. Wires 153 are connected to said rings 152 and respectively extend to the engines 6a. The structures of the engines 6a are immaterial, as far as the present invention is concerned, and they may be provided with any suitable starting means such as powder-jets.

The fuel may be supplied to the engines 6a from an axially disposed rotatable reservoir as heretofore described and as shown in Figs. 2 and 3, or as an alternative embodiment, the tip blade element, as shown in Fig. 1, may comprise a reservoir 46. Moreover, the central rotatable reservoir 9 may be the main reservoir, as shown in Fig. 2, in cases of relatively low fuel consumption or, as shown in Fig. 3, it may form an auxiliary tank for receiving fuel from a main tank carried by a body such as a fuselage. This latter arrangement shown in Fig. 3 is similar to that disclosed in Patent No. 2,585,468.

The principal difference between the structures of Figs. 2 and 3 resides in the fact that in Fig. 3 the crown 50 is fixed with the rotating part 1 together with the pinion 51 which it operates, and must necessarily hinge around the spherical joint articulation 22. Therefore the pinion 51 is journalled, preferably by means of an anti-friction ring 53, in a bracket 52 mounted on the universal hinge part 24. The pinion 51 is connected by a flexible shaft 54 with a fuel pump 55. Preferably, the fuel pump 55 is carried by the body adjacent the main tank and the flexible shaft 54 will have sufficient slack to accommodate hinging movement of the pinion 51. Fuel is forced by the fuel pump 55 up through a fuel tube 56, according to the arrow a, and this tube has a flexible portion at least where it traverses the spherical joint 22 in order to accommodate the universal hinging of the propeller. The upper part of the tube 56a is rigid and is passed into the reservoir 9 by an anti-friction ring 57 so as to allow for an easy rotation of the reservoir 9 around it.

The operation of the propeller regardless of the body on which it is mounted is as follows.

Before use the blades and the engines occupy a position as shown in full lines in Fig. 1.

When use is required the telescopic elements of the blades are placed in their position of flight as shown in Fig. 1 by dotted lines at 4c, either by hand or by means of the springs 60, which being in tension at rest will hinge the blades according to the arrow c, when the stops 61 are released by direct pull from the pilot. The legs 18 enter and are locked inside the locking device 17 and therefore the blades are elastically attached in their plane of rotation.

Then the engines 6a are started which will initiate rotation of the blades according to arrow d. The blades will begin to be developed, by virtue of the centrifugal force, the elastic feeding tubes 7 allowing for a progressive development of these blades, the full development taking place for a determined speed of rotation.

The throttle control of the engines is effected by the action of the ball-bearing systems 40 and 41 (Fig. 2) and the pitch angle of the blades is regulated by the action on the ball-bearing system 32.

During the take-off operation and during flight the stability, longitudinal and lateral, and as well the inclination of the propeller shaft (and not of the vertical axis of the machine or body), in the direction of flight, will be achieved by the action, direct as shown in the drawing, or indirect by means of convenient levers (not shown).

The direction of the machine around a vertical azimuth is achieved by the tilting of the vertical rudder both around a vertical axis and an horizontal axis (see Fig. 4) utilising to that effect the flow of air which is pushed downwards by the propeller during its rotation.

This propeller, possessing all the necessary requirements to be applied to a vertical flying machine will now be described in some of its main practical applications.

Fig. 4 shows the mounting of the propeller above a fuselage of an helicopter. This represents therefore a small helicopter machine, the blades being collapsed and hinged with the engines, as indicated in full lines. The space occupied is no more than the length and the width of the fuselage and in practice is approximately that of a motor-car. It can, therefore, be housed in any existing private garage for motor-cars.

The fuselage 63, horizontal at rest, is provided with the usual landing gear 64 and 65, the horizontal rudder 66 which can be suppressed in many cases, and the vertical rudder composed of two parts 67 and 67a, the former being hinged as usual around the vertical hinges 68 on the latter; while the usually fixed part 67a is hinged around axis $x_1x_1$ which is shown here inclined and not horizontal. The mechanism utilised in order to achieve this double rotation has been already described in the specification of my Patent No. 2,585,468.

The pilot's seat is shown at 69 the stability control lever and the control for inclining the propeller in order to achieve horizontal flight at 70.

Lever 70 is connected in the known way to levers 71 and 72, whose two ends are connected by wires or the like 73, 74 to four points at 90° apart on the fixed part 24 (Fig. 2) of the hub of the propeller.

The spherical joint articulation is shown at 22 and as explained here-above the action by the pilot on lever 70 will incline the propeller's axis in any required direction.

In dotted lines, is indicated the blades of the propeller fully developed, and also the lines of air flow which will be utilised by their action on the vertical rudder in order to direct the machine around its vertical axis.

In Fig. 5 is shown a "flying man," carrying the propeller on his back by means of a harness such as described in my Patent No. 2,506,873. When operation is required the pilot raises the propeller above his head in the way described in Patent No. 2,458,855 for a parachute. The propeller is locked automatically when over the head.

Then the engines are started and the blades develop themselves as shown in dotted lines.

The general incidence control, as well as the throttle control for the engines can be placed either in front of the pilot at 85 and 86, respectively, or can be placed below the fixed part 24 of the hub of the propeller (not shown in the drawing). The exact arrangement for extending the controls is not shown as this may be accomplished in any desired manner.

It is to be understood that the drawings are given by way of example and numerous other devices giving corresponding results and for the same purpose can be made. Other forms of realisation can be utilised as long as the principles are not altered.

For example, the number of blades can be greater than two. The double articulation of the blades can be realised in any different way.

The propeller can be mounted in bodies other than those described.

The fitting of the fuel tube inside the rotating tank can be different and a small ball-bearing be fitted instead of the anti-friction ring.

On the motor-car helicopter, a cover for the propeller at rest may be provided.

The inclination of the shaft of the propeller can be realised by different mechanical means.

The telescopic bladed propeller can very advantageously be applied to all the other types of helicopters which have their rotor driven by an engine or engines fitted inside the fuselage.

What I claim is:

1. A sustaining propeller for flying devices, comprising a hub structure, blades of telescopic structure extending from said hub structure and having an external configuration of aerofoil section, jet propulsion units mounted at the outer ends of the tip elements of the blades, and means to feed fuel to said jet propulsion units and including a reservoir carried by said hub structure and extensible connecting pipes extending from said reservoir through said blades to said units.

2. A sustaining propeller for flying devices, comprising a hub, blades of telescopic structure extending from said hub and having an external configuration of aerofoil section, jet propulsion units at the outer ends of the tip elements of the blades, said units being positioned on said outer ends in approximately a tangential position with respect to said hub when the blades are in their position of rest, and means to feed fuel to said units and including a reservoir located near the centre of the propeller and extensible connecting pipes extending from said reservoir through said blades to said units.

3. A sustaining propeller according to claim 1, wherein said extensible feed pipes are resilient, whereby said pipes may be extended and are resistant to extension and oppose the development of the blades when they are set into rotation and to retract the blades when the speed of rotation falls below a given value.

4. A sustaining propeller for flying machines, comprising a hub, blades of telescopic structure hingedly mounted on said hub and having an external configuration of aerofoil section, propulsion units mounted at the outer ends of the tip elements of the blades, a fuel reservoir carried by said hub and rotatable with the blades, expansible pipe sections running through the blades and connected to said propulsion units, and flexible supply pipes connected between the reservoir and the expansible pipe sections, whereby to accommodate hinging movement, changes of incidence and oscillations of the blades.

VITTORIO ISACCO.

References Cited in the file of this patent

UNITED STATES PATENTS

| Number | Name | Date |
|---|---|---|
| 1,718,577 | Pitcairn | June 25, 1929 |
| 1,820,946 | Pitcairn | Sept. 1, 1931 |
| 1,855,084 | Alvistur | Apr. 19, 1932 |
| 1,932,702 | Langdon | Oct. 31, 1933 |
| 1,983,493 | Stalker | Dec. 4, 1934 |
| 2,108,245 | Ash | Feb. 15, 1938 |
| 2,120,168 | Ash | June 7, 1938 |
| 2,180,922 | Bothezat | Nov. 21, 1939 |
| 2,371,687 | Gerhardt | Mar. 20, 1945 |
| 2,415,584 | Fleiss | Feb. 11, 1947 |

FOREIGN PATENTS

| Number | Country | Date |
|---|---|---|
| 366,450 | Great Britain | of 1930 |